(12) United States Patent
Monroe et al.

(10) Patent No.: US 11,667,422 B2
(45) Date of Patent: Jun. 6, 2023

(54) SPOUT HANDLING AND APPLYING SYSTEM

(71) Applicant: ZALKIN AMERICAS LLC, Statham, GA (US)

(72) Inventors: Andrew Monroe, Athens, GA (US); Benoist Lainé, Caorches-Saint-Nicolas (FR); Julien Chevalier, Ferrières Saint Hilaire (FR); Quentin Marie, Lisieux (FR); Simon Guerrier, Marolles (FR)

(73) Assignee: ZALKIN AMERICAS LLC, Statham, GA (US)

( * ) Notice: Subject to any disclaimer, the term of this patent is extended or adjusted under 35 U.S.C. 154(b) by 322 days.

(21) Appl. No.: 16/911,621

(22) Filed: Jun. 25, 2020

(65) Prior Publication Data

US 2021/0403193 A1    Dec. 30, 2021

(51) Int. Cl.
| | | |
|---|---|---|
| *B65G 47/38* | (2006.01) | |
| *B65G 47/82* | (2006.01) | |
| *B65B 61/18* | (2006.01) | |
| *F27B 9/16* | (2006.01) | |
| *F27D 3/12* | (2006.01) | |
| *B65G 47/14* | (2006.01) | |
| *F27D 3/00* | (2006.01) | |

(52) U.S. Cl.
CPC ........ *B65B 61/186* (2013.01); *B65G 47/1407* (2013.01); *B65G 47/38* (2013.01); *B65G 47/82* (2013.01); *F27B 9/16* (2013.01); *F27D 3/12* (2013.01); *F27D 2003/0037* (2013.01); *F27D 2003/124* (2013.01)

(58) Field of Classification Search
None
See application file for complete search history.

(56) References Cited

U.S. PATENT DOCUMENTS

| | | | |
|---|---|---|---|
| 4,876,930 A | 10/1989 | Thatcher | |
| 5,257,560 A | 11/1993 | Palazzolo | |
| 5,564,319 A | 10/1996 | Kowal | |
| 5,617,768 A | 4/1997 | Palazzolo | |
| 5,840,349 A | 11/1998 | Brown, Jr. et al. | |
| 5,855,299 A | 1/1999 | Arnold et al. | |
| 6,205,746 B1 * | 3/2001 | Moss | B65B 61/186 493/57 |
| 6,321,813 B1 | 11/2001 | Miyajima et al. | |

(Continued)

*Primary Examiner* — Kavel Singh
(74) *Attorney, Agent, or Firm* — Thompson Hine LLP (57) ABSTRACT

A machine for applying spouts to containers includes a heating tunnel for heating spouts, and a conveyor for conveying spouts through the heating tunnel for heating. The conveyor is a loop conveyor including a plurality of spout holding rack assemblies mounted thereon, wherein the loop conveyor defines a conveyor path from a spout loading zone, through the heating tunnel and then back to the spout loading zone. The machine includes (i) multi-material warp resistant rack holding assemblies, and/or (ii) a spout infeed track at a spout infeed side of the conveyor that includes an adjustment assembly for permitting adjustment of a number of spouts fed from the spout infeed track into an aligned spout holding rack assembly, and/or (iii) a spout emptying passage at a spout outfeed side of the conveyor, and/or (iv) a controller configured to track the position of each spout holding rack assembly along the conveyor path.

22 Claims, 13 Drawing Sheets

(56) References Cited

U.S. PATENT DOCUMENTS

| | | |
|---|---|---|
| 6,619,946 B1 | 9/2003 | Marshall et al. |
| 6,722,102 B1 | 4/2004 | Pape et al. |
| 6,763,752 B2 | 7/2004 | Marshall et al. |
| 6,886,437 B2 | 5/2005 | Waldstadt |
| 6,952,988 B2 | 10/2005 | Darr |
| 7,607,375 B2 | 10/2009 | Harding |
| 11,305,948 B2 * | 4/2022 | Koscielski ........... B65G 54/025 |
| 2004/0050220 A1 | 3/2004 | Proffitt et al. |

* cited by examiner

SPOUT HANDLING AND APPLYING SYSTEM

TECHNICAL FIELD

This application relates generally to machines that apply spouts to containers.

BACKGROUND

Machines that apply spouts to containers, such as pour spouts on containers of laundry detergent, are known. For example, U.S. Pat. No. 7,607,375 in which moils are cut from container necks, and spouts are applied. The spouts are heated in a gravity feed through oven, with three distinctive parallel lines, prior to application to the container necks in order to activate a hot-melt adhesive coating on the spouts. The heated spouts are then applied to the containers three at a time. This system suffers from speed issues, as well as problems with glue spillage for spouts that remain in the oven too long, and the need to apply the spouts to containers shortly after coming out of the oven.

Accordingly, it would be desirable to provide an improved spout heating and application system.

SUMMARY

In one aspect, a machine for applying spouts to containers includes a heating tunnel for heating spouts, and a conveyor for conveying spouts through the heating tunnel for heating. The conveyor is a loop conveyor including a plurality of spout holding rack assemblies mounted thereon, wherein the loop conveyor defines a conveyor path from a spout loading zone, through the heating tunnel and then back to the spout loading zone. The machine includes at least one of the following: (i) each spout holding rack assembly is a multi-material warp resistant assembly; and/or (ii) a spout infeed track at a spout infeed side of the conveyor includes an adjustment assembly for permitting adjustment of a number of spouts fed from the spout infeed track into an aligned spout holding rack assembly; and/or (iii) a spout emptying passage is provided at a spout outfeed side of the conveyor in alignment with a spout infeed track at a spout infeed side of the conveyor; and/or (iv) a controller is configured to track the position of each spout holding rack assembly along the conveyor path, wherein the controller is configured to permit each spout holding rack assembly to be individually designated as disabled for preventing use thereof.

The details of one or more embodiments are set forth in the accompanying drawings and the description below. Other features, objects, and advantages will be apparent from the description and drawings, and from the claims.

DETAILED DESCRIPTION

Referring to FIGS. 1-5, a spout applying system 10 is shown and includes a bulk hopper 12 for holding spouts, a spout elevator 14 that feeds spouts from the bulk hopper 12 up to a spout sorter 16. The spout sorter 16 orients the spouts and feeds them to a conveying system 18 that feeds spouts from the sorter 16 and includes spout infeed track 20. The spout infeed track 20 runs to a spout infeed side of a conveyor 22 that receives the spouts and moves them through a heating tunnel 24. The heated spouts are then moved off the conveyor, by a pusher 26 on an output side of the heating tunnel, and into a spout chute 28 the delivers the spouts down to a capping machine 30 (e.g., a monobloc capper) with a pick-and-place device 34 that picks and places the spouts onto container necks. The containers are fed to the capping machine by a conveyor 32a, rotate around the monobloc capper during spout application to the container, and then fed out of the capping machine by a conveyor 32.

Figure 1:
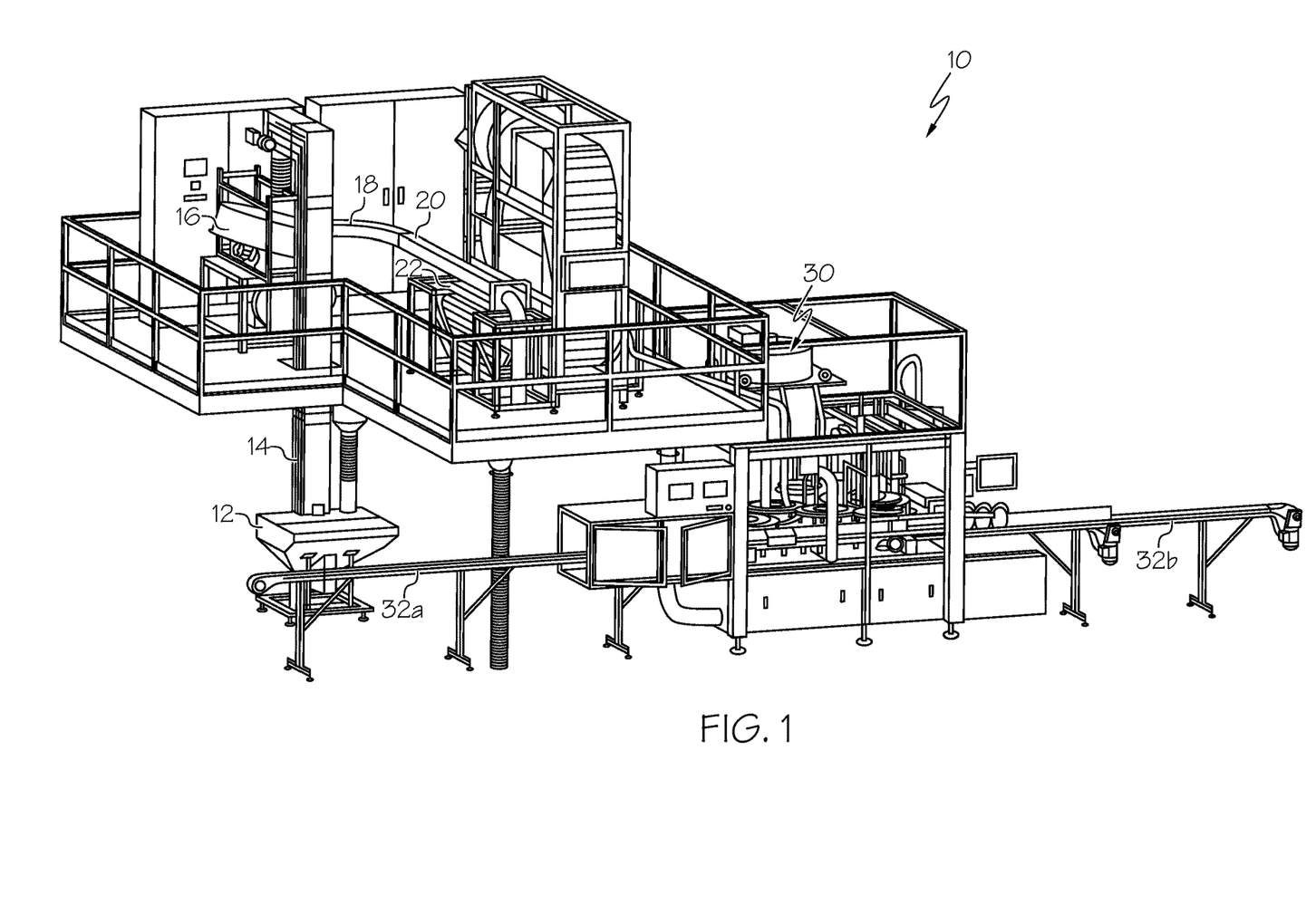
FIGS. 1-4 show perspective views of a spout applying system.
Figure 2:
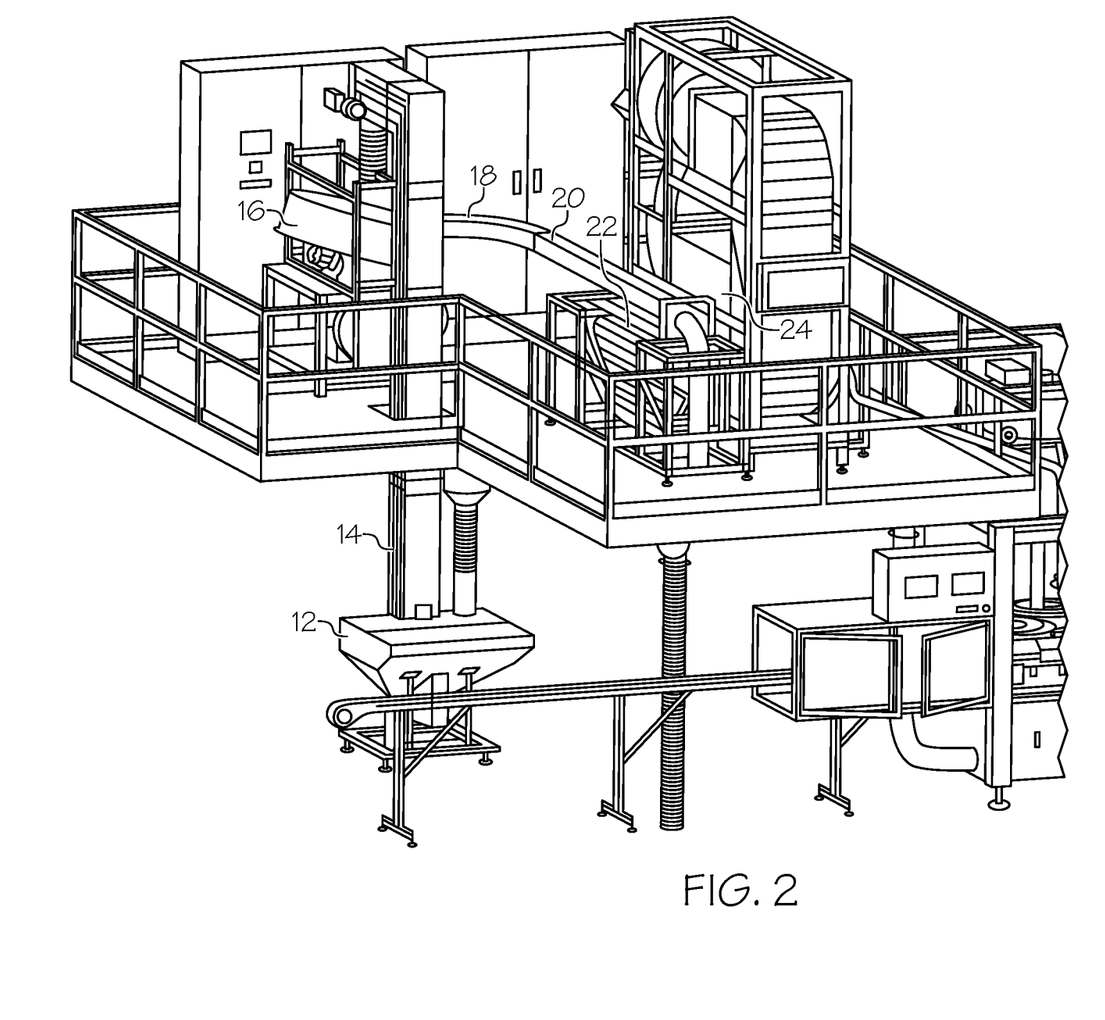
Figure 3:
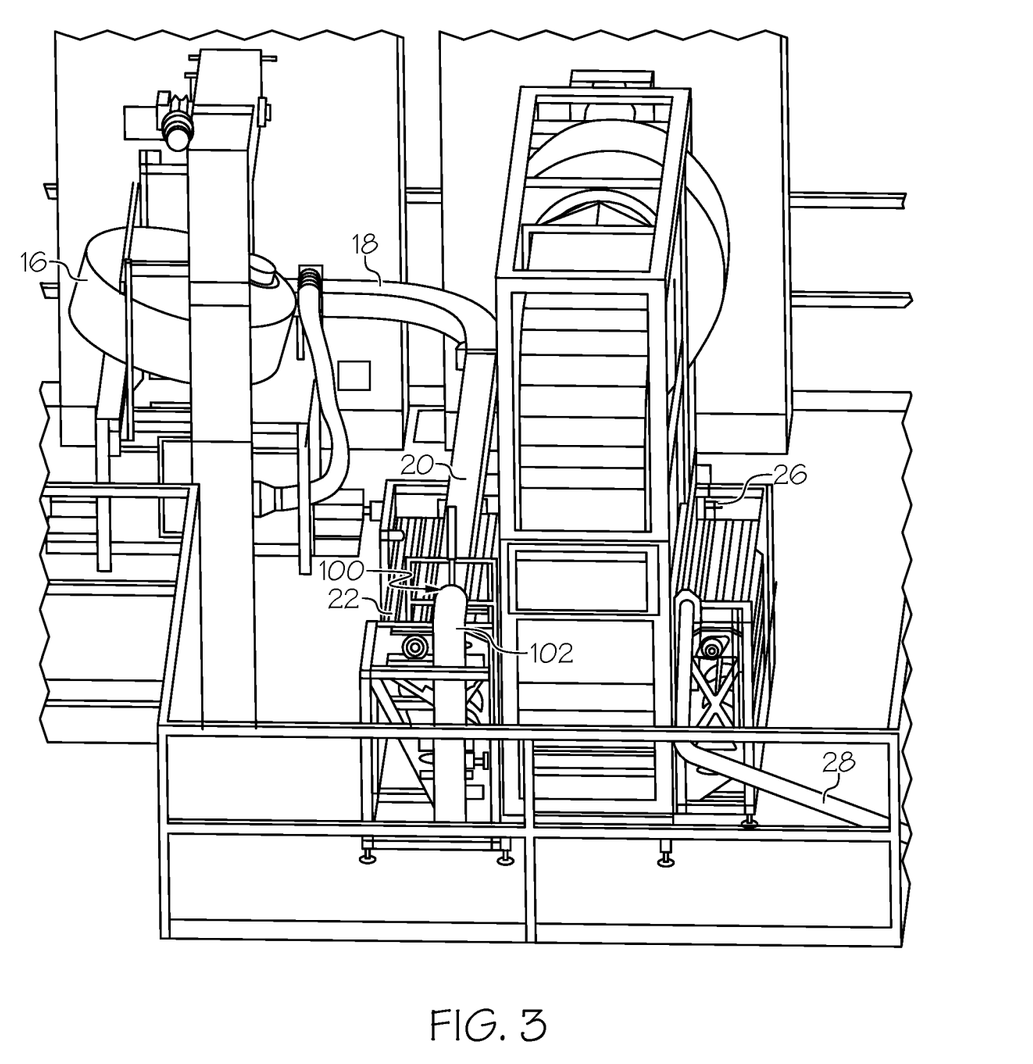
Figure 4:
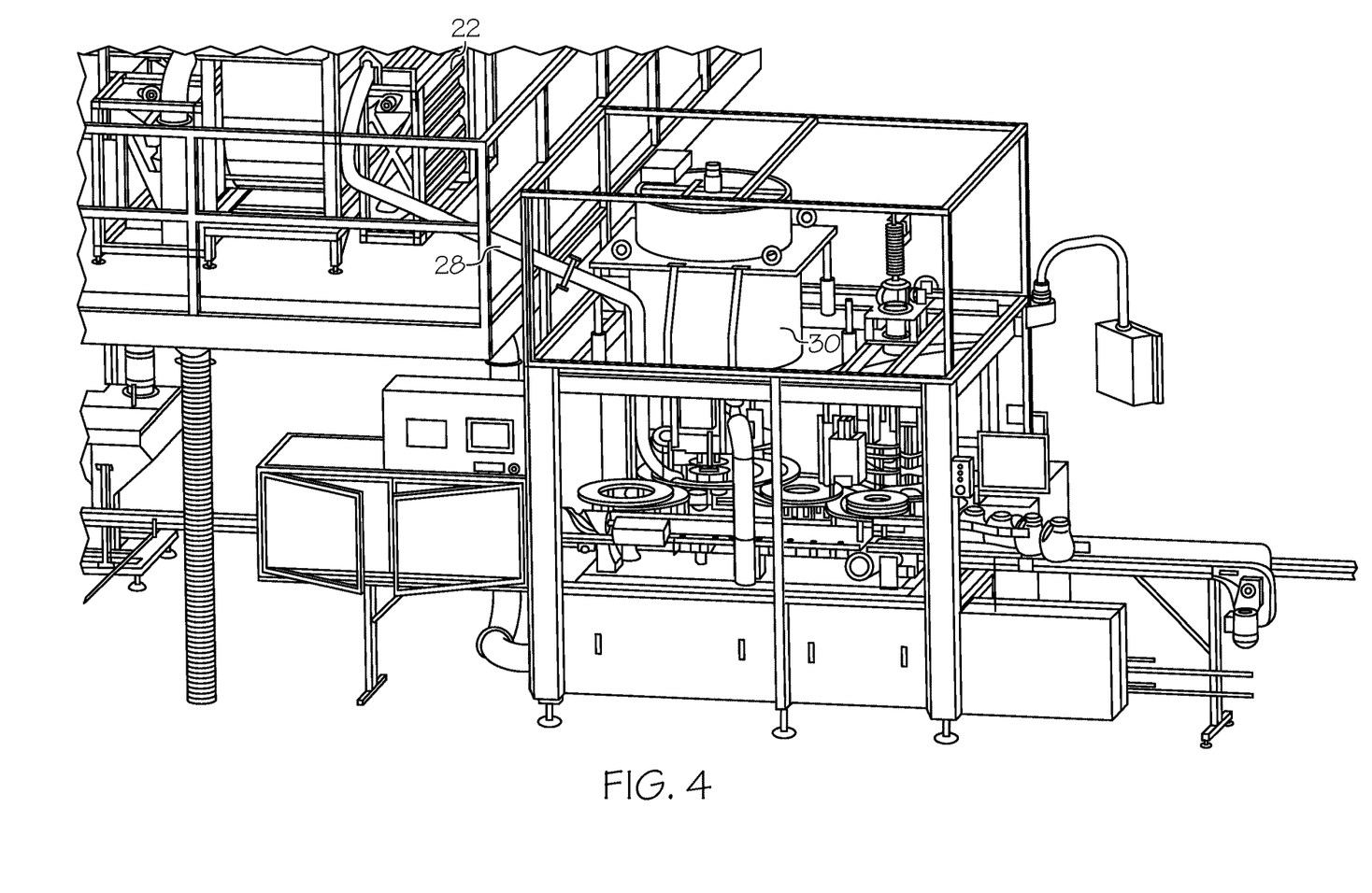
Figure 5:
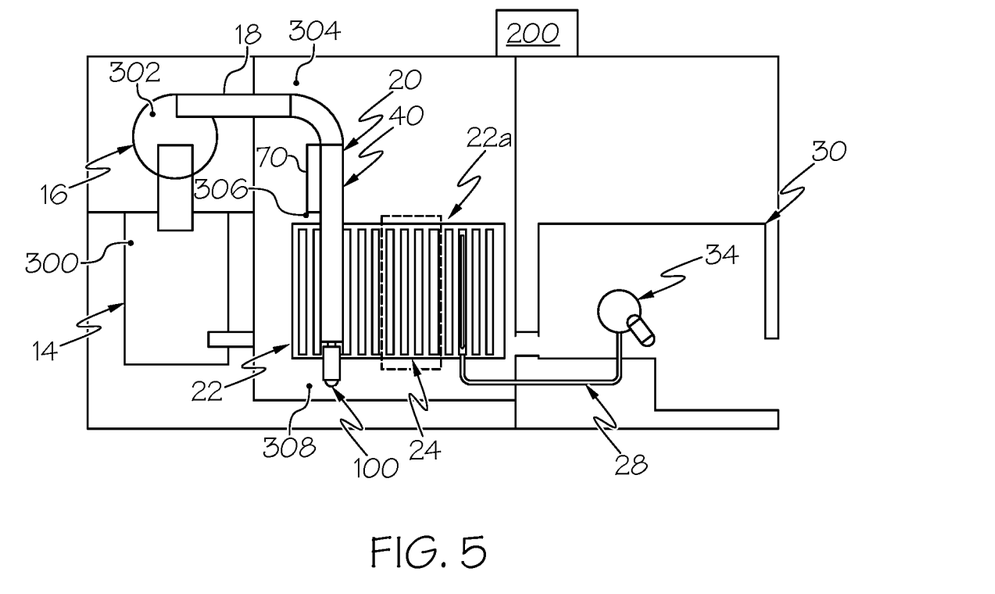
FIG. 5 shows a top plan schematic view of the system.
Figure 6:
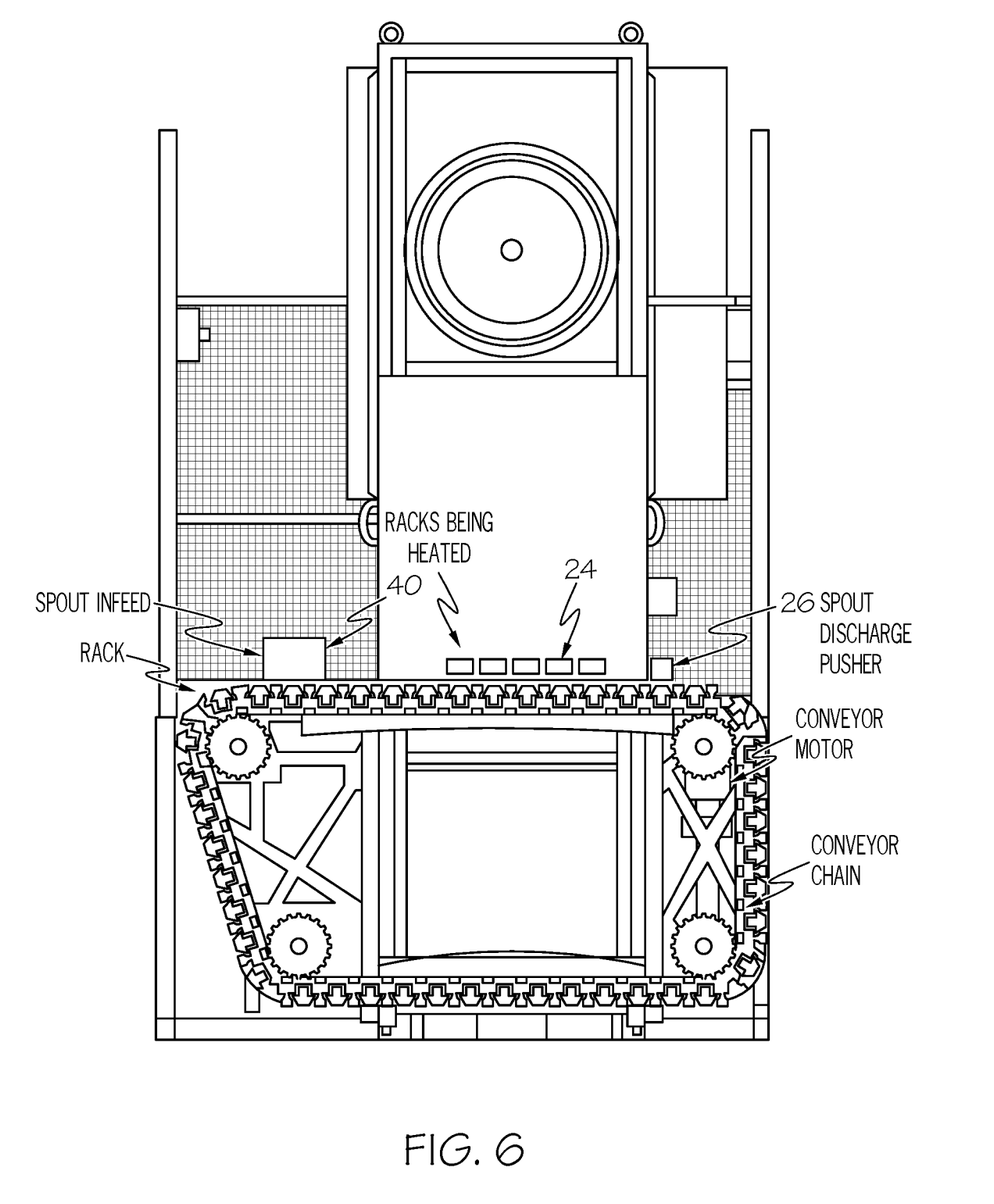
FIG. 6 is a side elevation schematic of the conveyor and heating tunnel of the system.
Figure 7:
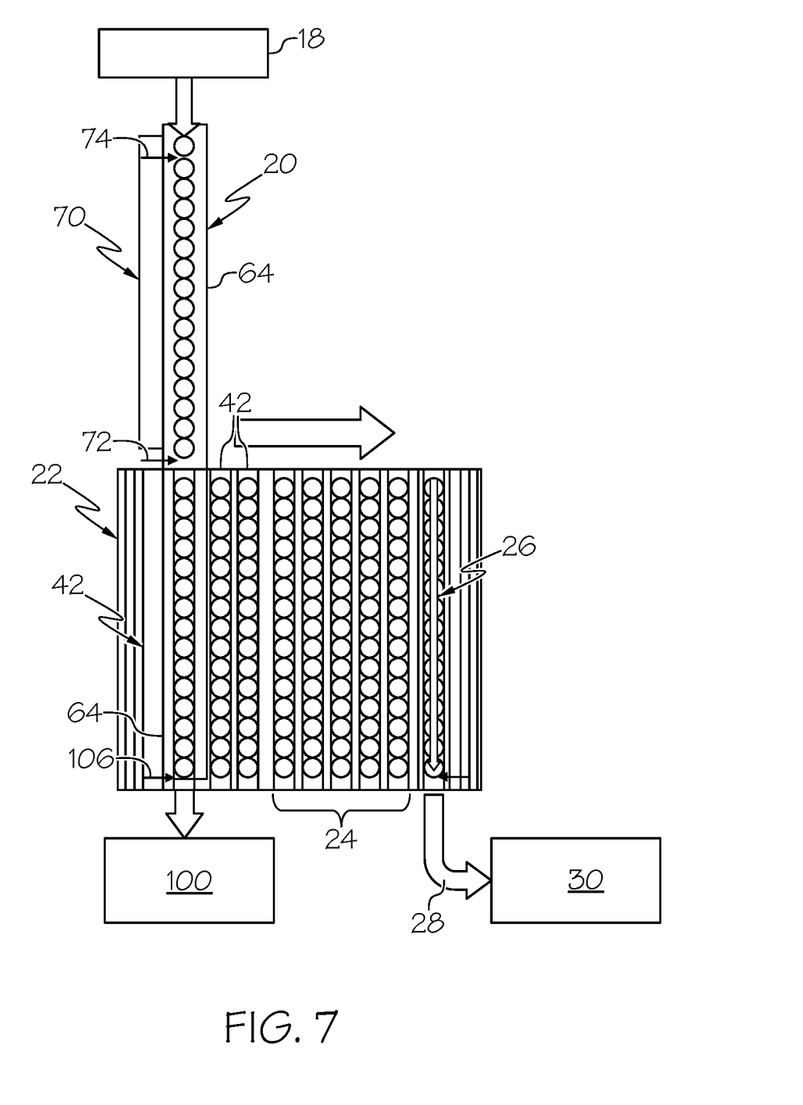
FIG. 7 is a top plan schematic of the conveyor and heating tunnel.

Referring to FIGS. 6 and 7, the conveyor 22 is a loop conveyor, including a plurality of spout holding rack assemblies 42 mounted thereon, wherein the loop conveyor that defines a conveyor path from a spout loading zone 40, through the heating tunnel 24 and then back to the spout loading zone 40.

Figure 8:
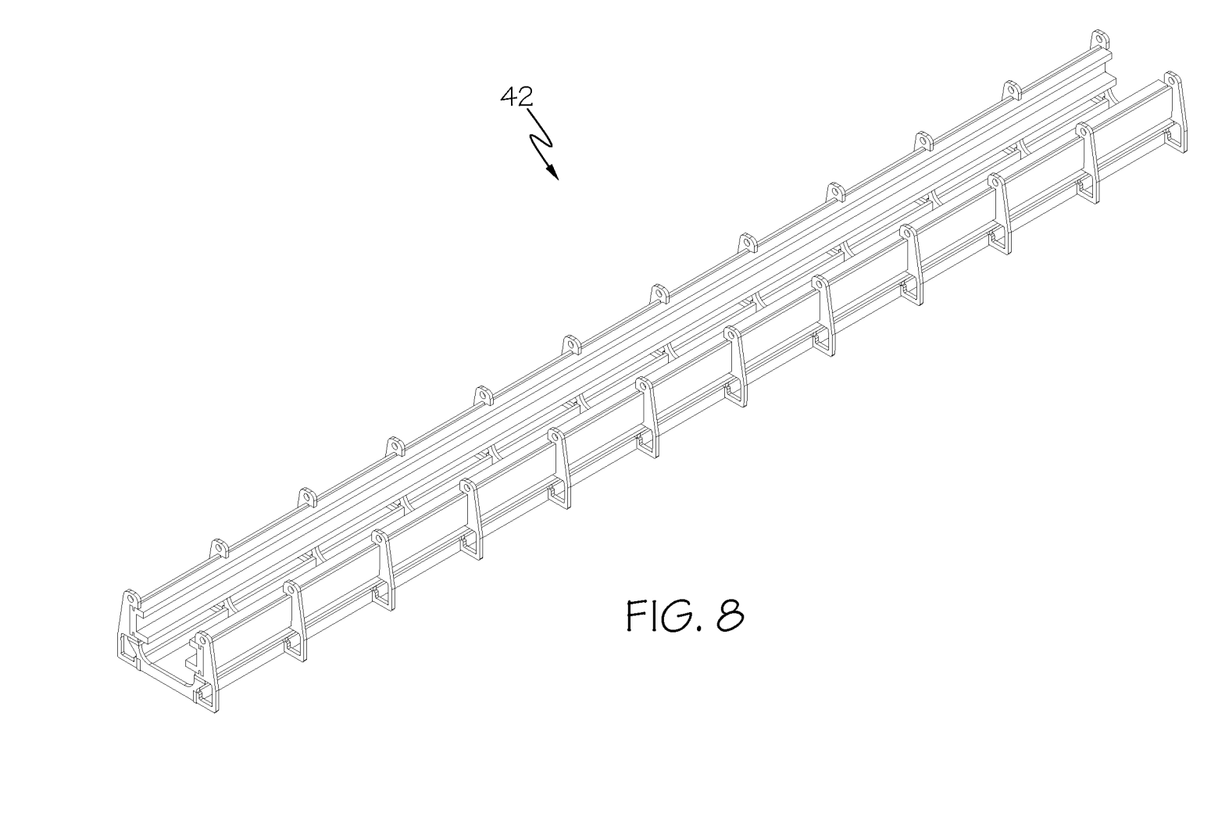
FIG. 8 is a perspective view of a rack assembly.
Figure 9:
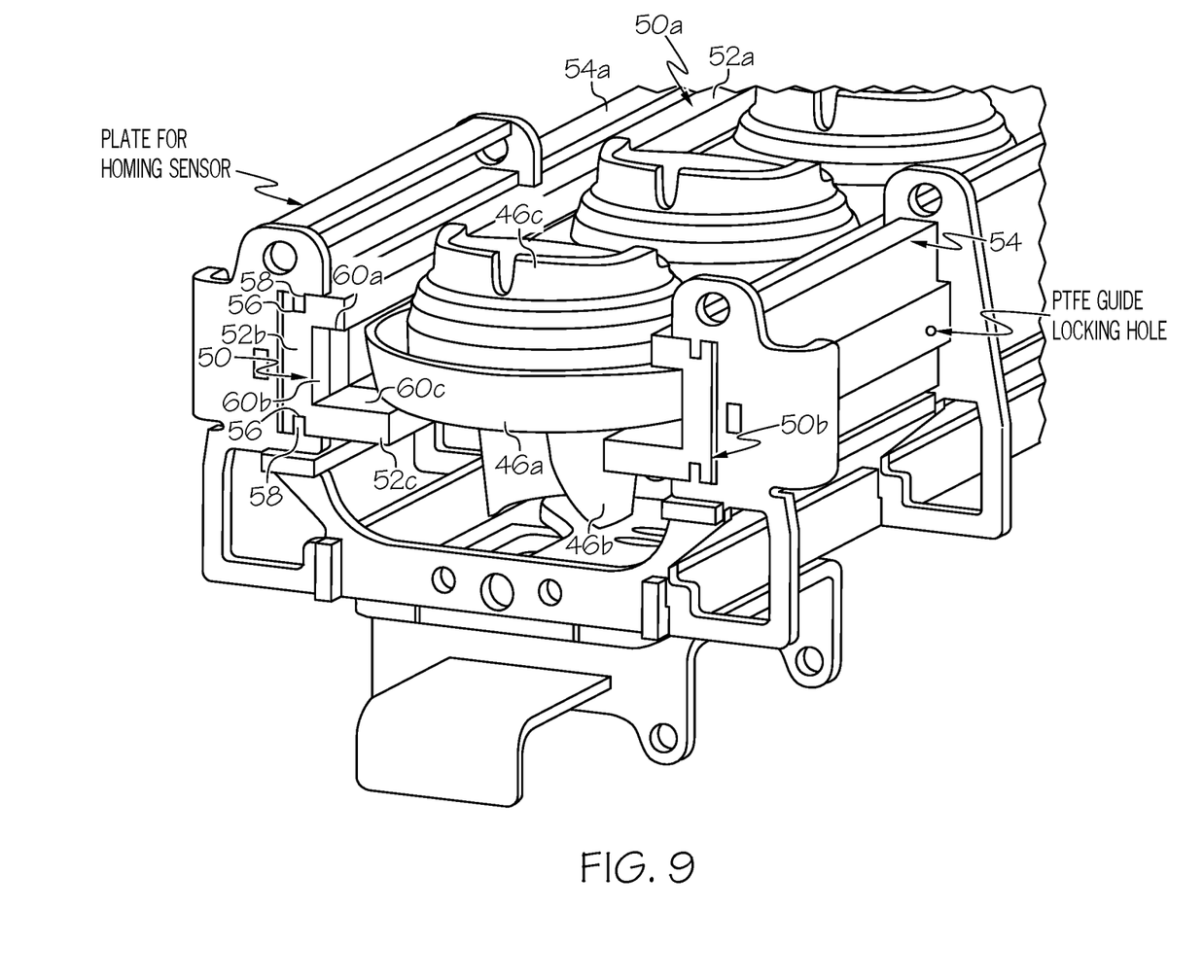
FIG. 9 is a partial perspective view of the infeed end of a rack assembly.

Referring to FIGS. 8 and 9, each spout holding rack assembly 42 includes a guide 50 defining spaced apart slots 52 for supporting the spouts. Each slot is defined by an upper wall segment 52a, a side wall segment 52b and a lower wall segment 52c, arranged to form a c-shaped slot. As shown, each spout 46 includes an enlarged diameter rim portion 46a, a spout portion 46b and a neck insert portion 46c. The slots 52 support diametrically opposed segments of the rim portion of each spout, with the spout portion 46b oriented downward, and with spouts able to slide along the slots 52. For this purpose, the guide is formed of a high temperature polymer material (e.g., extruded PTFE), and the guide is carried by a stainless steel support frame 54 that inhibits warpage of the guide 50 that could be caused by the heating. The stainless steel support frame 54 extends along and supports the guide 50 along a full length of the guide.

Here, the guide 50 is formed by two separate spaced apart guide track members 50a and 50b, each guide track member defining one of the spaced apart slots. Each guide track member (e.g., 50a) is engaged with a respective side portion (e.g., 54a) of the stainless steel support frame 54 by at least one (here two) axially running recess 56 that receives an axially running rail 58 of the frame side portion. Thus, the guide track members 50a and 50b can be slidingly engaged into the side portions of the frame 54. This arrangement permits some axial elongation of the guide track members relative to the respective side portion. Here, the axially running recesses 56 are formed in the guide track members, and the axially running rails 58 are formed in the frame side portions, The side portions of the frame may include lateral openings 58 that enable the guide track members to be locked to the frame side portions (e.g., by a pin or set screw) so that the guide track members 50a, 50b do not migrate out of the frame 54.

Figure 10:
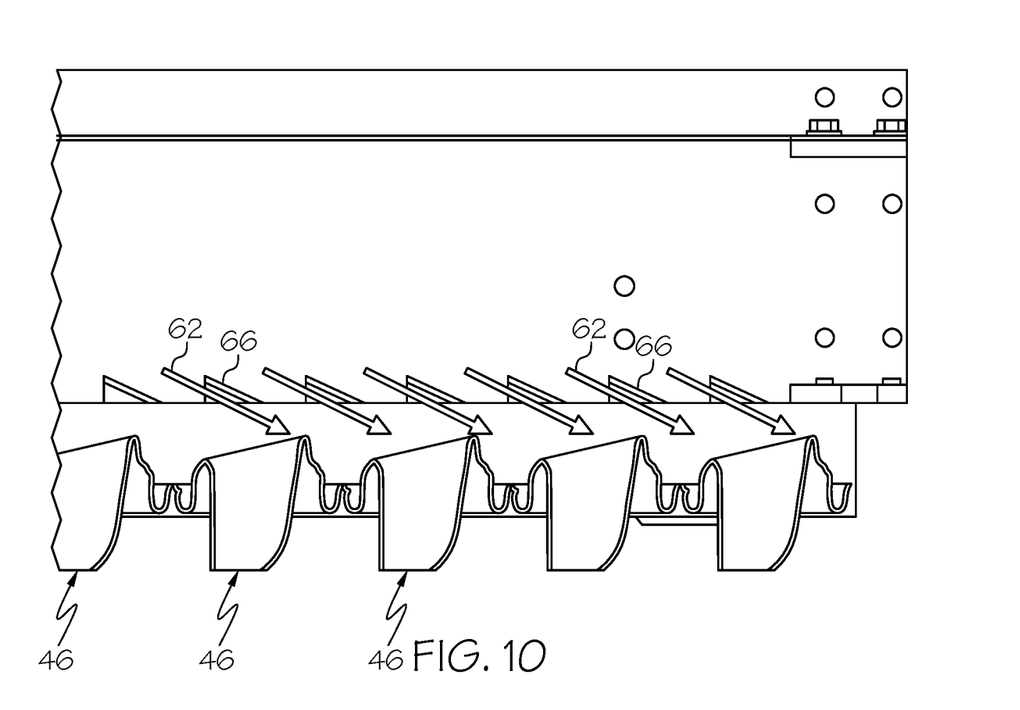
FIG. 10 shows directional air flows or an air conveyor arrangement.

Notably, each guide track member 50a, 50b includes a spout infeed end (shown in FIG. 9) with entry chamfers to the slot 52. Here, the entry chamfers of each guide track member include an upper chamfer 60a on upper wall segment 52a, a side chamfer 60b in side wall segment 52b and a lower chamfer 60c on lower wall segment 52c. Thus, the chamfers form an entry end of the slot that is enlarged and tapers to a reduced main slot size (e.g., the entry end of the slot reduces in lateral dimension and height dimension in a movement direction of spouts into the guide). This configuration facilitates infeed of the spouts without jamming. In this regard, referring to FIGS. 7 and 10, the spouts may be moved from the spout infeed track 20 into the racks on the conveyor 22 by an air conveyor system in which the spouts 46 ride on spaced apart support rails along the infeed section and directional air flows 62 cause the spouts to slide along the rails toward the conveyor 22. The air conveyor is formed by an overhead duct 64 with vent slots 66 that provide the desired direction air flows. Per FIG. 7, the overhead duct 64 also extends over the conveyor 22 so that directional air flows continue to move the spouts along a rack once the spouts have entered a rack that is aligned with the infeed track 20. The entire upstream conveying system 18 may also use this type of air conveyor arrangement.

Figure 11:
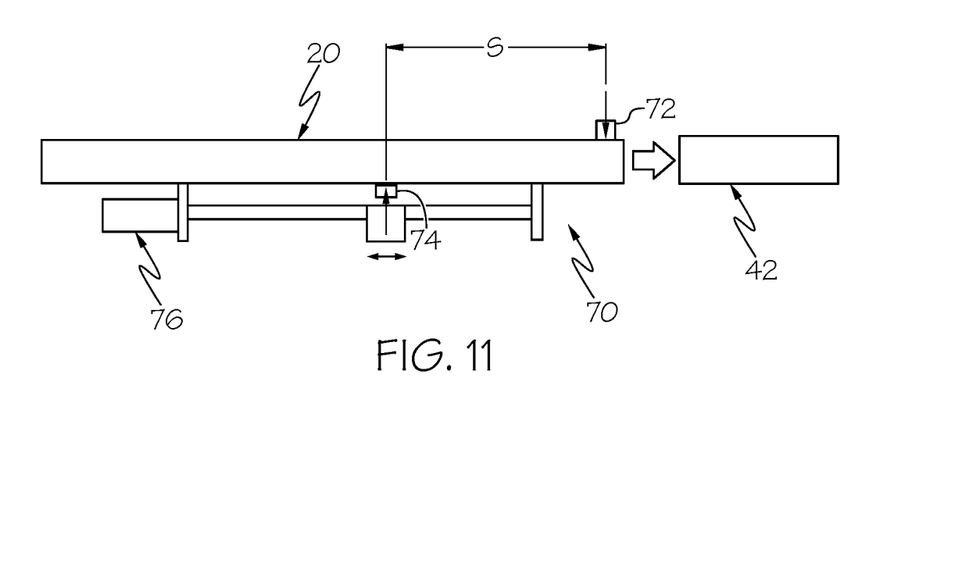
FIG. 11 shows a top plan schematic of a spout feed number adjustment assembly of the spout infeed track.
Figure 12:
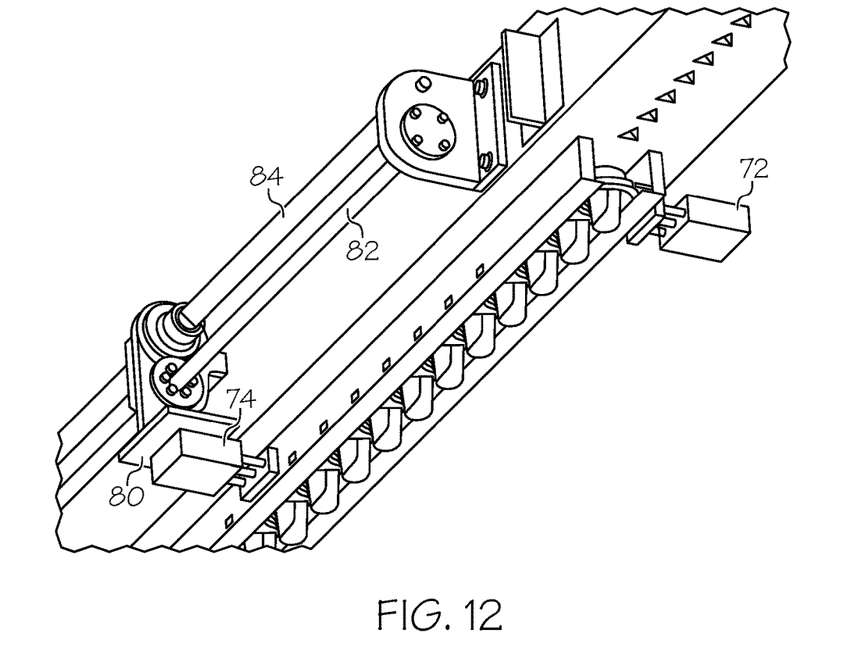
FIGS. 12 and 13 are partial perspectives of the adjustment assembly.
Figure 13:
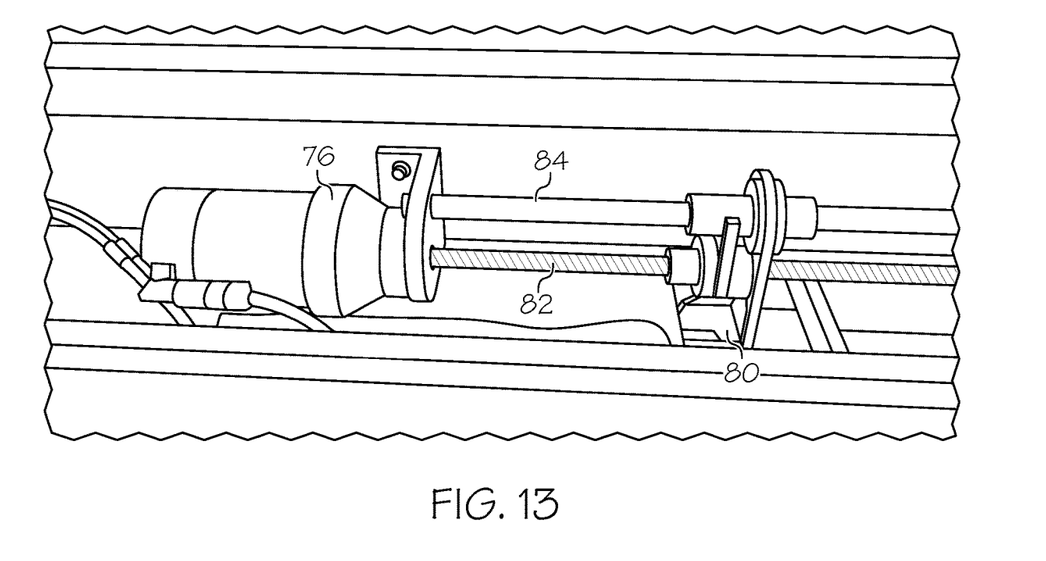

Although precise control of spout movement with the directional air flows is not practical based solely upon flow/no flow state of the air, the infeed track 20 is configured to enable precise control of the number of spouts that will be fed into each rack on the conveyor 42. More specifically, each spout holding rack assembly 42 is selectively alignable with the spout infeed track (e.g., under control of a controller 200 that controls a conveyor drive motor 68) for loading of spouts into the infeed end of the spout holding rack assembly. The spout infeed track 20 includes an adjustment assembly 70 for permitting adjustment of a number of spouts fed from the spout infeed track 20 into an aligned spout holding rack assembly. Here, the adjustment assembly 70 includes an end gate 72 along the spout infeed track and another gate 74 at a position upstream and along the spout infeed track. Each gate includes a spout block state, in which part of the gate will block movement of spouts even if the directional air flows are present, and a spout pass state, in which the part of the gate is repositioned (out of the spout movement path) so that spouts will be moved by the directional air flows. Wherein an axial position of at least one of the first gate or the second gate along the spout infeed track is movable. By way of example, the gates could be solenoid or pneumatic actuator type gates, although other variations are possible. Importantly, wherein an axial spacing S between the two gates 72 and 74 is adjustable, via movement of gate 74 per arrow 76, and the spacing defines a number of spouts that will fed into an aligned rack assembly 42. The axial position of the gate 74 is adjustable via a motor 76 (under control of the controller 200). Here, the gate 74 is carried on a body 80 that is threadedly mounted on a screw 82 that runs axially alongside the infeed track, and the motor 76 is connected to rotate the screw. The body 80 is also slidably mounted to a parallel slide rod 84, such that rotation of the screw 82 causes axial movement of the body 80 and the gate 74, with the direction of movement controlled by the direction of screw rotation. As seen in FIG. 13, the side of the infeed track may include markings that visually identify the number of spouts that will fit between the two gates 72 and 74. Operationally, the end gate 72 is positioned in its spout block state while the gate 74 is positioned in spout pass state, which allows the air flows to load the infeed track with spouts until the space between the two gates is full. In order to load an aligned rack assembly 42 with the number of spouts that is defined by the axial position of gate 74, the gate 74 is switched to its spout block state and then the end gate 72 is switched to its spout pass state, so that only the spouts between the two gates will be fed into the rack assembly.

The system is also configured to track the position of each rack assembly, as well as the number of spouts in each rack assembly and the heating status of the spouts in each rack assembly. In this regard, referring again to FIG. 9, one rack assembly 42 on the conveyor can be configured as a homing rack with a plate 90 that is detectable by a homing sensor (e.g., optical sensor, magnetic sensor or contact sensor) 92 along the conveyor path. The controller 200 is programmed with the number of rack assemblies mounted on the conveyor, the length of the conveyor path and the spacing between rack assemblies, and therefore is able to track the position of each rack assembly along the conveyor path once the homing rack has been detected at the position of the homing sensor 92. Each rack assembly is assigned an identifier (e.g., Rack(1)=homing rack, and Rack(2)–Rack(n) for the remaining rack assemblies sequentially around the conveyor). In this arrangement, the controller therefore tracks which rack assembly is being loaded with what number of spouts, and where the rack assembly is at all times.

Figure 14:
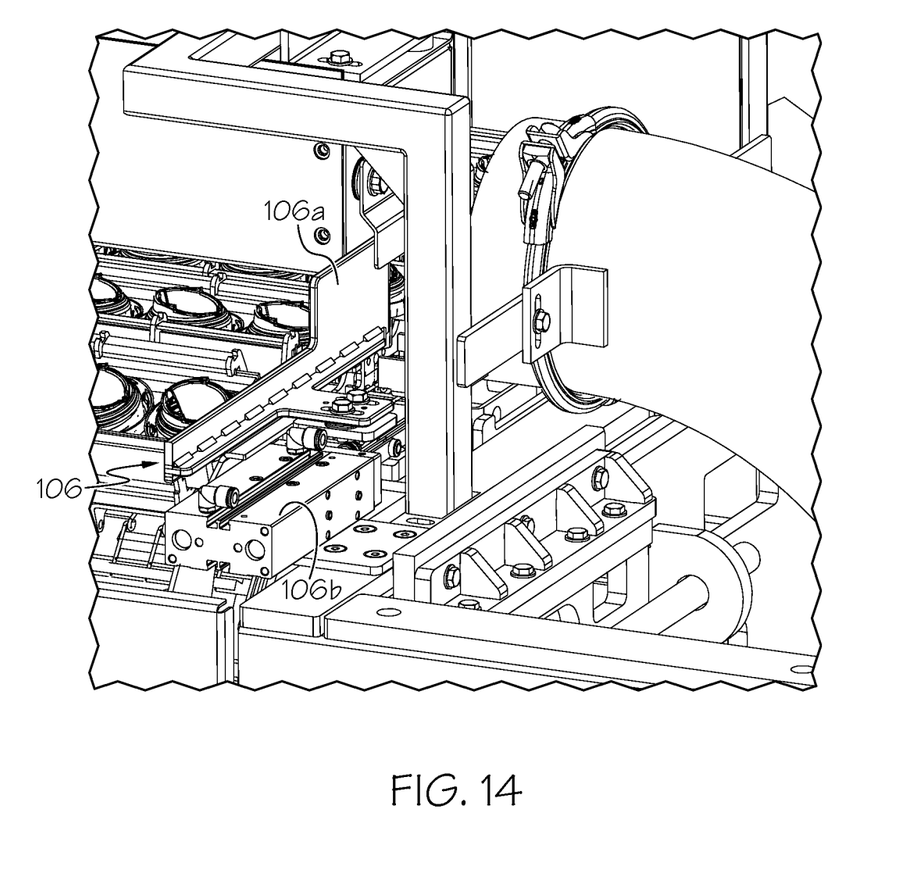
FIG. 14 is a perspective of the emptying passage.

Each spout holding rack assembly includes an infeed end toward a spout infeed side 22a of the conveyor 22, and also includes an outfeed end toward a spout outfeed side 22b of the conveyor. As mentioned, each spout holding rack assembly is selectively alignable with the spout infeed track 20 for loading of spouts into the infeed end of the spout holding rack assembly. A spout emptying passage 100 is located at the spout outfeed side 22b of the conveyor 22, with the passage 100 in axial alignment with the infeed track 20. Here, the passage 100 is formed by a pipe 102 with an input opening 104 aligned with the spout infeed track such that the outfeed end of each spout holding rack assembly aligns with the input opening when the infeed end of the spout holding rack assembly aligns with the spout infeed track. A gate 106 is positioned between outfeed end of the rack assembly and the input opening 104 of the spout emptying passage. The gate 106 is normally in a spout block state so that as spouts are loaded into the rack assembly they move to end of the rack assembly and then stop so that they are retained in the rack assembly for subsequent carrying through the heating tunnel. Thus, in the blocking position of gate 106 spouts moving into the spout infeed side of the conveyor are prevented from moving out of the spout outfeed side of the conveyor. However, the gate is selectively movable (under control of controller 200) to a spout pass state (shown in FIG. 14) that defines a non-blocking position in which spouts moving into the spout infeed end of the rack assembly move to and beyond the outfeed end of the rack assembly and into the input opening 104 of the spout emptying passage 100. Here, the gate 106 includes a gate plate 106a mounted to an actuator 106b.

Figure 16:
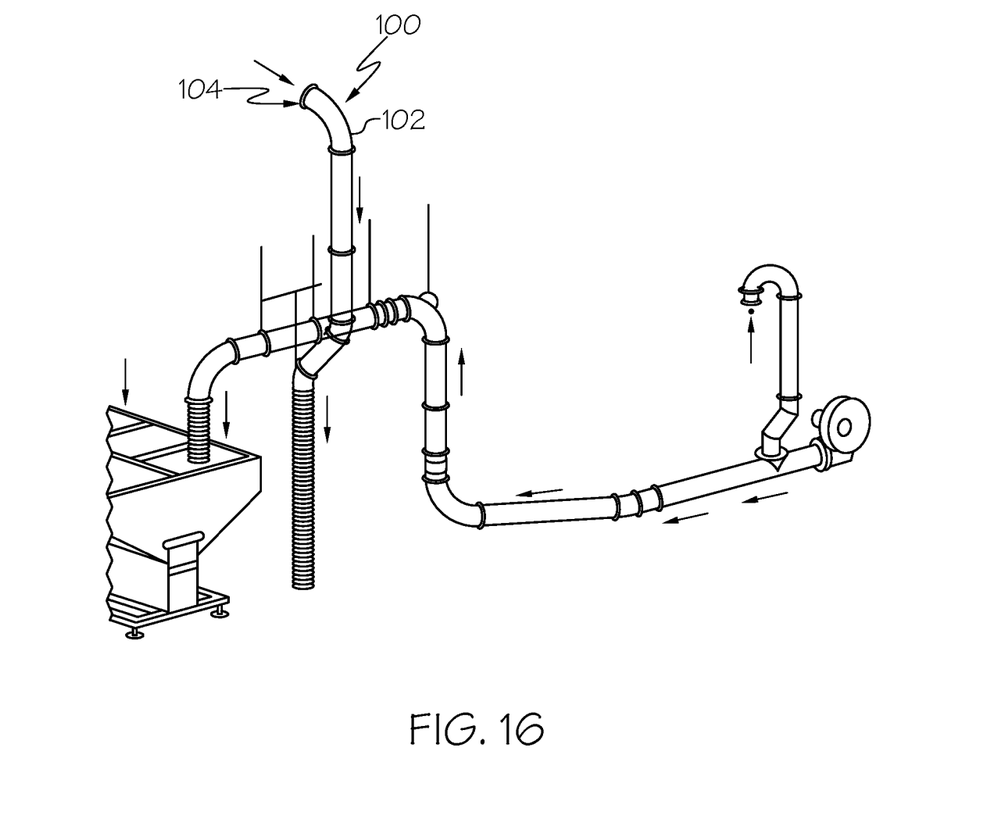
FIG. 16 is a partial perspective view of spout emptying and recycling paths of the system.

The controller 200 is configured for operation in a spout feed path emptying mode in order to empty the spout elevator 14, spout sorter 16 and conveying system 18 of spouts. In this mode, the controller is configured to operate the components so as to move all spouts within the spout elevator up and through the spout sorter, all spouts in the spout sorter along the conveying system through the spout infeed track, into the spout infeed end of an aligned rack assembly of the conveyor, out of the spout outfeed end of the rack assembly, and into the input opening 104 of the spout emptying passage 100. The passage pipe 102 may, for example, lead to a capture bin for the spouts for future recycling. During the spout emptying mode various sensors are monitored to determine when emptying is complete. For example, a sensor 300 associated with the elevator identifies a low level of spouts in the hopper 12, a sensor 302 identifies a low level of spouts in the sorter 16, sensors 304 and 306 detect the presence of sensors along the conveying system 18, and a spout passage sensor 308 (e.g., positioned near the input opening 104) detects spouts passing into the emptying pipe 102, and such sensors are monitored by the controller 200. Once the sensors 300 and 302 indicate low, sensor 308 continues to be monitored and, after a set time period (e.g., 5 to 15 seconds, such as 10 seconds) of no spout passage indicated by sensor 308, the controller steps the conveyor 22 backward, away from the heating tunnel (to align the previous spout holding rack assembly with the emptying pipe) and waits the set time period before stepping the conveyor backward again for another spout holding rack assembly, and so on for a set number of spot holding rack assemblies). In this way, the racks are also emptied of spouts. The emptying mode is useful for spout color changeovers (e.g., emptying the bulk elevator, sorter and air conveyor to pass another spout color on the machine), end of production situations and cleaning operations.

The controller is also configured for operation in a rack assembly emptying mode to operate the components such that all spouts within an identified spout holding rack assembly are passed to the input opening 104 of the spout emptying passage 100 to empty the identified rack assembly without emptying the spout infeed track. This mode may be used when a determination is made that the spouts in the rack assembly are no longer useful for application to containers. For example, the controller is configured to track the position of each spout holding rack assembly and to identify a given spout holding rack assembly 42 for emptying, pursuant to the rack assembly emptying mode, when the given spout holding rack assembly is carrying spouts that have been passed through the heating tunnel 24 more than a specified number of times (e.g., after two passes through the tunnel). The controller is configured to identify that the given spout holding rack assembly holds spouts that have already passed through the heating tunnel 24 based upon whether the spout pusher 26 at the output side of the heating tunnel 24 was activated to empty the rack assembly when the rack assembly was in a position aligned with the spout pusher 26.

Figure 15:
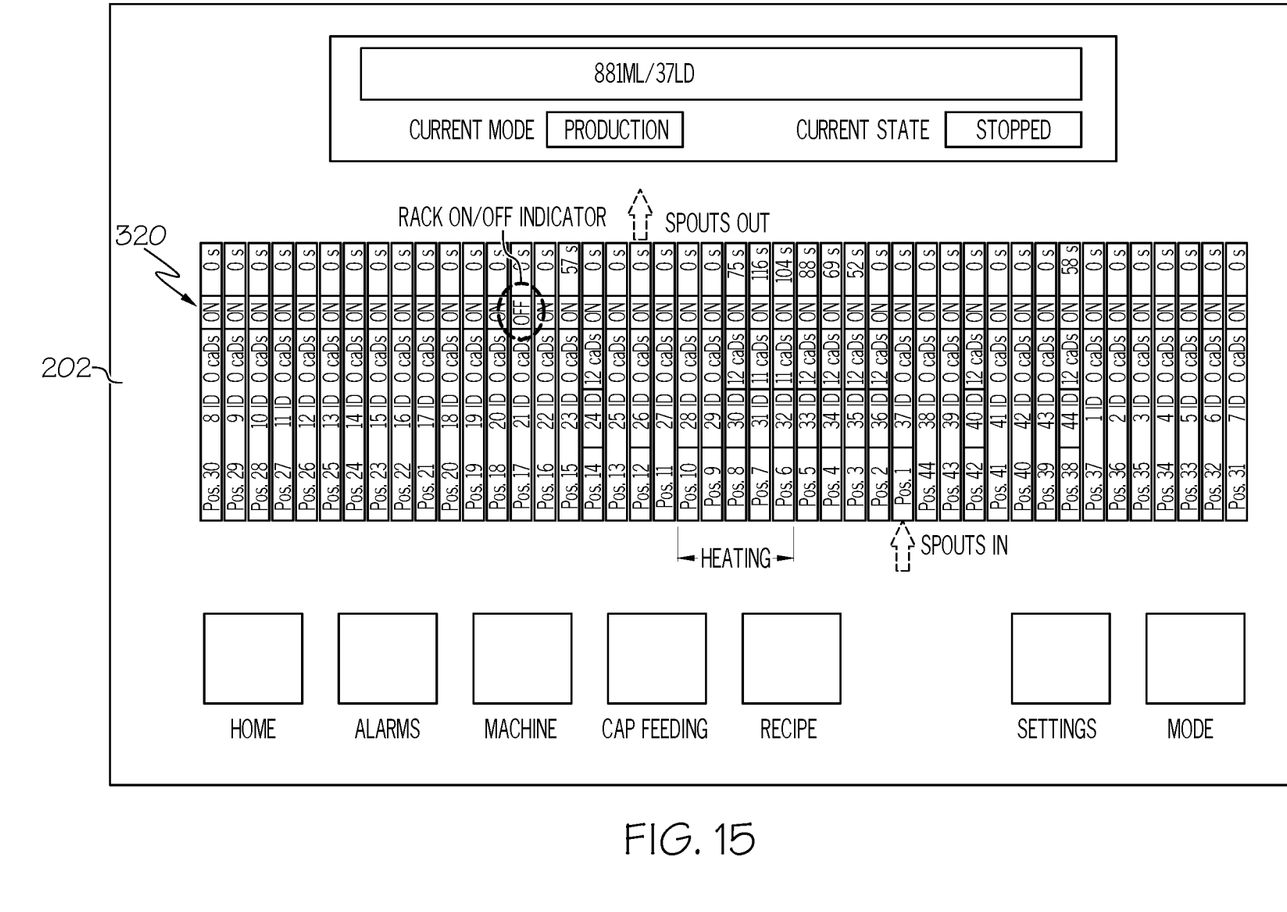
FIG. 15 shows a user interface of the system.

As mentioned above, the controller 200 is configured to track the position of each spout holding rack assembly 42 along the conveyor path. The controller 200 is configured with an associated user interface 202 that enables each spout holding rack assembly 42 to be individually designated as disabled for preventing use thereof. The controller 200 is configured such that, for each spout holding rack assembly has been designated as disabled, the controller prevents spouts from being loaded into the spout holding rack assembly when the spout holding rack assembly is aligned with the spout loading zone. Thus, if a given rack assembly is defective (e.g., experiencing loading jams) an operator can designate that rack assembly as disabled (e.g., by clicking on a selectable rack enable/disable button 320 displayed on the display screen) in association with the elongated graphic that represents each rack).

As used herein, the term controller is intended to broadly encompass any circuit (e.g., solid state, application specific integrated circuit (ASIC), an electronic circuit, a combinational logic circuit, a field programmable gate array (FPGA)), processor(s) (e.g., shared, dedicated, or group—including hardware or software that executes code), software, firmware and/or other components, or a combination of some or all of the above, that carries out the control functions of the device or the control functions of any component thereof.

It is to be clearly understood that the above description is intended by way of illustration and example only, is not intended to be taken by way of limitation, and that other changes and modifications are possible.

What is claimed is:

1. A machine for applying spouts to containers, comprising:
    a heating tunnel for heating spouts;
    a conveyor configured for conveying spouts through the heating tunnel for heating, wherein the conveyor is a loop conveyor including a plurality of spout holding rack assemblies mounted thereon, wherein the loop conveyor defines a conveyor path from a spout loading zone, through the heating tunnel and then back to the spout loading zone;
    wherein each spout holding rack assembly is a multi-material warp resistant assembly;
    wherein each spout holding rack assembly has a length configured for holding multiple spouts as the rack holding assembly is conveyed through the heating tunnel.

2. The machine of claim 1, wherein each spout holding rack assembly comprises:
    a guide defining spaced apart slots for supporting opposed rim portions of the spouts,
    wherein the guide is formed of a high temperature polymer material, wherein the guide is carried by a stainless steel support frame that inhibits warpage of the guide.

3. The machine of claim 2, wherein the stainless steel support frame extends along and supports the guide along a full length of the guide.

4. The machine of claim 2, wherein the guide is formed by spaced apart guide tracks, each guide track defining one of the spaced apart slots.

5. The machine of claim 4, wherein each guide track is engaged with a respective side portion of the stainless steel support frame by at least one axially running recess that receives an axially running rail so as to permit axial elongation of the guide track relative to the respective side portion.

6. The machine of claim 5, wherein the axially running recess is formed in the guide track and the axially running rail is formed in the respective side portion.

7. The machine of claim 2, wherein each guide track includes a spout infeed end with entry chamfers to the slot.

8. The machine of claim 7, wherein the entry chamfers of each guide track include a side chamfer, an upper chamfer and a lower chamfer, wherein the entry chamfers collectively define an enlarged slot end that tapers, when moving in a direction of spout movement, to a reduced main slot size.

9. A machine for applying spouts to containers, comprising:
    a heating tunnel for heating spouts;
    a conveyor configured for conveying spouts through the heating tunnel for heating, wherein the conveyor is a loop conveyor including a plurality of spout holding rack assemblies mounted thereon, wherein the loop conveyor defines a conveyor path from a spout loading zone, through the heating tunnel and then back to the spout loading zone; and a spout infeed track located at a spout infeed side of the conveyor, wherein the spout infeed track includes an adjustment assembly for permitting adjustment of a number of spouts fed from the spout infeed track into an aligned spout holding rack assembly;

wherein each spout holding rack assembly has a length configured for holding multiple spouts as the rack holding assembly is conveyed through the heating tunnel.

10. The machine of claim 9, wherein the adjustment assembly includes a first gate along the spout infeed track and a second gate along the spout infeed track, each of the first gate and the second gate include a spout block state and a spout pass state, wherein an axial position of at least one of the first gate or the second gate along the spout infeed track is movable, wherein an axial spacing between the first gate and the second gate defines a number of spouts to be fed.

11. The machine of claim 10, wherein the first gate is an end gate of the spout infeed track and the second gate is an upstream gate of the spout infeed track, and the axial position of the second gate is adjustable via a motor.

12. The machine of claim 11, wherein the second gate is carried on a body that is threadedly mounted on a screw that runs axially along the infeed track, wherein the motor is connected to rotate the screw, wherein rotation of the screw causes axial movement of the body and the second gate.

13. A machine for applying spouts to containers, comprising:

a heating tunnel for heating spouts;

a conveyor configured for conveying spouts through the heating tunnel for heating, wherein the conveyor is a loop conveyor including a plurality of spout holding rack assemblies mounted thereon, wherein the loop conveyor defines a conveyor path from a spout loading zone, through the heating tunnel and then back to the spout loading zone; and a spout emptying passage is provided at a spout outfeed side of the conveyor in alignment with a spout infeed track at a spout infeed side of the conveyor;

wherein each spout holding rack assembly has a length configured for holding multiple spouts as the rack holding assembly is conveyed through the heating tunnel.

14. The machine of claim 13, wherein:

each spout holding rack assembly includes an infeed end toward the spout infeed side of the conveyor and an outfeed end toward the spout outfeed side of the conveyor;

each spout holding rack assembly is selectively alignable with the spout infeed track for loading of spouts into the infeed end of the spout holding rack assembly;

the spout emptying passage includes an input opening aligned with the spout infeed track such that the outfeed end of each spout holding rack assembly aligns with the input opening when the infeed end of the spout holding rack assembly aligns with the spout infeed track.

15. The machine of claim 14, wherein:

a gate is positioned between the outfeed end of the conveyor and the input opening of the spout emptying passage, wherein the gate is selectively movable between a blocking position, in which spouts moving into the infeed end of a spout holding rack assembly are prevented from moving out of the outfeed end of the spout rack holding assembly, and a non-blocking position, in which spouts moving into the infeed end move to and beyond the outfeed end into the input opening of the spout emptying passage.

16. The machine of claim 15, wherein:

a bulk hopper is provided for holding a supply of spouts, a spout elevator feeds spouts from the bulk hopper up to a spout sorter and a conveying system feeds spouts from the spout sorter and includes the spout infeed track;

a controller is configured for operation in a spout feed path emptying mode to empty the spout elevator, the spout sorter and the conveying system of spouts, wherein the controller is configured such that, in the spout feed path emptying mode, the controller operates the machine components to move all spouts within the spout elevator, the spout sorter and the conveying system to the spout infeed track, into the spout infeed side of the conveyor, out of the spout infeed side of the conveyor, and into the input opening of the spout emptying passage.

17. The machine of 15, wherein a controller is configured for operation in a rack assembly emptying mode to operate the components such that all spouts within an identified spout holding rack assembly are passed to the input opening of the spout emptying passage to empty the identified rack assembly without emptying the spout infeed track.

18. The machine of claim 17, wherein the controller is configured to track the position of each spout holding rack assembly and to identify a given spout holding rack assembly for emptying, pursuant to the rack assembly emptying mode, when the given spout holding rack assembly is carrying spouts that have been passed through the heating tunnel more than a specified number of times.

19. The machine of claim 18, wherein the controller is configured to identify that the given spout holding rack assembly holds spouts that have already passed through the heating tunnel based upon whether a spout pusher at an output side of the heating tunnel activates when the given spout holding rack assembly is in a position aligned with the spout pusher.

20. A machine for applying spouts to containers, comprising:

a heating tunnel for heating spouts;

a conveyor for conveying spouts through the heating tunnel for heating, wherein the conveyor is a loop conveyor including a plurality of spout holding rack assemblies mounted thereon, wherein the loop conveyor defines a conveyor path from a spout loading zone, through the heating tunnel and then back to the spout loading zone; and a controller is configured to track a position of each spout holding rack assembly along the conveyor path, wherein the controller is configured to permit each spout holding rack assembly to be individually designated as disabled for preventing use thereof;

wherein the controller is configured such that, for each spout holding rack assembly has been designated as disabled, the controller prevents spouts from being loaded into the spout holding rack assembly when the spout holding rack assembly is aligned with the spout loading zone.

21. A machine for applying spouts to containers, comprising:

a heating tunnel for heating spouts;

a conveyor for conveying spouts through the heating tunnel for heating, wherein the conveyor is a loop conveyor including a plurality of spout holding rack assemblies mounted thereon, wherein the loop conveyor defines a conveyor path from a spout loading zone, through the heating tunnel and then back to the spout loading zone; and a controller is configured to track a position of each spout holding rack assembly along the conveyor path, wherein the controller is configured to permit each spout holding rack assembly to be individually designated as disabled for preventing use thereof;

a user interface associated with the controller, wherein the controller is configured to provide a display of a disabled or enabled status of each spout holing rack assembly.

22. The machine of claim 21, wherein the controller is configured to provide a display of a location of each spout holding rack assembly relative to a heating zone of the heating tunnel.

* * * * *